No. 703,701. Patented July 1, 1902.
W. F. HALL.
TROLLEY WHEEL.
(Application filed Apr. 30, 1902.)
(No Model.)
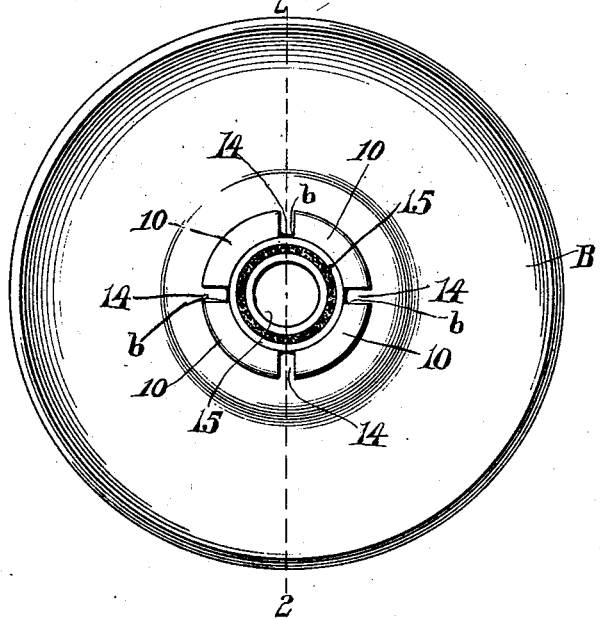
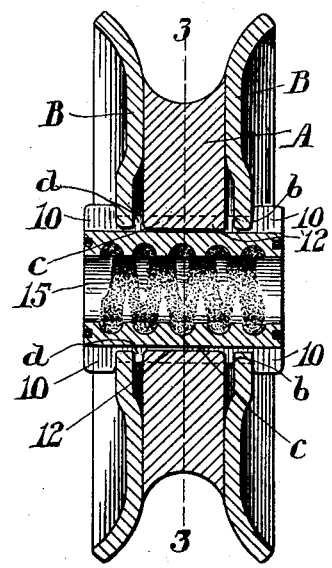
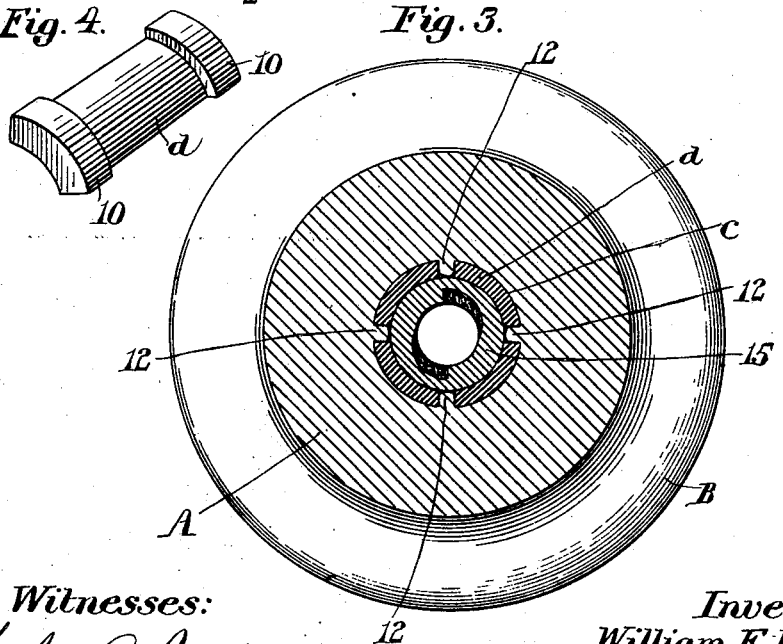
Witnesses:
Walter O. Lombard
F. B. Spaulding
Inventor:
William F. Hall,
by Teschemacher Atty.

UNITED STATES PATENT OFFICE.

WILLIAM F. HALL, OF BOSTON, MASSACHUSETTS.

TROLLEY-WHEEL.

SPECIFICATION forming part of Letters Patent No. 703,701, dated July 1, 1902.

Application filed April 30, 1902. Serial No. 105,395. (No model.)

*To all whom it may concern:*

Be it known that I, WILLIAM F. HALL, a citizen of the United States, residing at Boston, in the county of Suffolk and State of Massachusetts, have invented certain Improvements in Trolley-Wheels, of which the following is a specification.

My invention relates to separable trolley-wheels composed of a central grooved portion for contact with the trolley-wire, side disks arranged on opposite sides of the same, and a central sleeve or bushing forming a bearing for the axle. To provide a simple and reliable means for clamping and holding together the several parts or members of a wheel of this description is the object of my invention, which consists in the combination, with the central portion and side disks of a separable trolley-wheel, of a series of flanged keys fitted within the central opening or bore of the wheel and forming when in place therein a sectional hub having its members spaced apart and a central bushing driven into said sectional hub and serving to hold its members firmly in place against the walls of the central opening with the flanges at their outer ends bearing against the outer faces of the side disks, whereby the several parts of the wheel are securely clamped and held together without liability of becoming loosened or separated from each other, as hereinafter more fully set forth.

In the accompanying drawings, Figure 1 is a side elevation of a trolley-wheel constructed in accordance with my invention. Fig. 2 is a vertical section of the same on the line 2 2 of Fig. 1. Fig. 3 is a section on the line 3 3 of Fig. 2. Fig. 4 is a perspective view of one of the members of the sectional hub.

In the said drawings, A represents the central portion of a separable trolley-wheel preferably composed of copper, bronze, or like metal having a high degree of conductivity and provided with a peripheral groove for contact with the trolley-wire, which is retained in place by the side disks or flanges B B, preferably composed of steel and arranged on opposite sides of the central portion A, each disk being provided with a central opening $b$, coincident with the central bore $c$ of the portion A. Within the central bore $c$ are inserted a series of concavo-convex keys $d$, each forming a section of a hub or sleeve and being provided at its opposite ends with outwardly-projecting flanges 10, which when the key is in place lap over and bear against the outer faces of the side disks or flanges B, as shown in Figs. 1 and 2. These keys $d$ are spaced apart and maintained at a uniform distance from each other by lugs 12, projecting into the central bore of the wheel and occupying the spaces between the several sections of the hub, the central opening of each side disk B being also provided with similar lugs 14, which engage the said spaces or openings between the keys, whereby the several parts are securely locked in place and rotary movement independently of each other prevented. Within the sectional hub thus formed is driven an antifriction-bushing 15, which acts to hold the keys or sections $d$ securely in place with their flanges 10 against the outer faces of the disks B, the several parts of the wheel being thus firmly locked together and prevented from becoming loose or disconnected from each other, while when the central portion A becomes worn and requires to be replaced by a new one it is simply necessary to drive out the central bushing 15, when the keys $d$ can be removed, leaving the side disks free to be separated from the central portion A. The antifriction-bushing 15 may be of any suitable or approved construction, that here shown being provided at its opposite ends and on its inner surface with grooves for containing powdered graphite or other similar lubricant.

What I claim as my invention, and desire to secure by Letters Patent, is—

1. In a separable trolley-wheel, the combination with the central portion and side disks arranged upon opposite sides of the same, of a sectional hub composed of a series of concavo-convex keys provided at their opposite ends with outwardly-extending flanges adapted to overlap and bear against the side disks to hold the latter in place against the central portion, and a central sleeve or bushing driven into said sectional hub to hold its members in place within the central bore of the wheel.

2. A separable trolley-wheel comprising a central portion, side disks or flanges arranged on opposite sides of the same, said central portion and disks having their central openings provided with inwardly-projecting lugs, a sectional hub composed of a series of concavo-convex keys lying in the grooves or spaces between said lugs, said keys being provided at their opposite ends with outwardly-projecting flanges adapted to overlap and bear against the side disks to hold the latter in place against the central portion, and a central sleeve or bushing driven into said sectional hub and acting to hold its members in place within the central bore of the wheel.

Witness my hand this 26th day of April, A. D. 1902.

WILLIAM F. HALL.

In presence of—
P. E. TESCHEMACHER,
T. E. O'BRIEN.